Sept. 6, 1932.   H. G. BEGEMAN   1,875,365
MUFFLE KILN
Filed Aug. 23, 1930   2 Sheets-Sheet 2
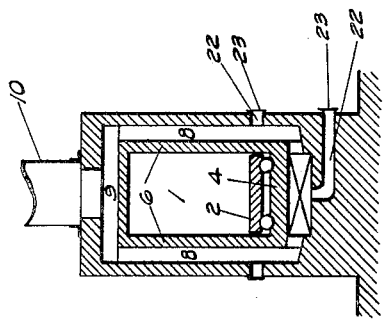
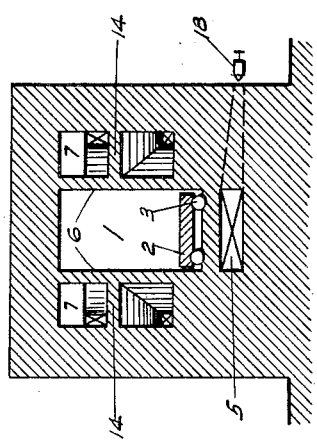
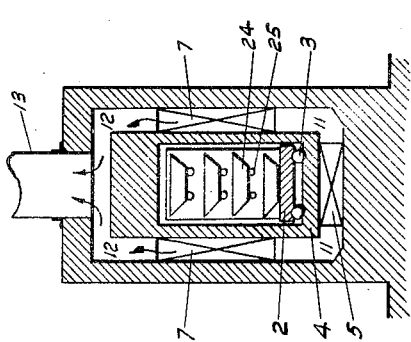
INVENTOR
Henry G. Begeman.
BY
Knight Bros.
ATTORNEYS Patented Sept. 6, 1932

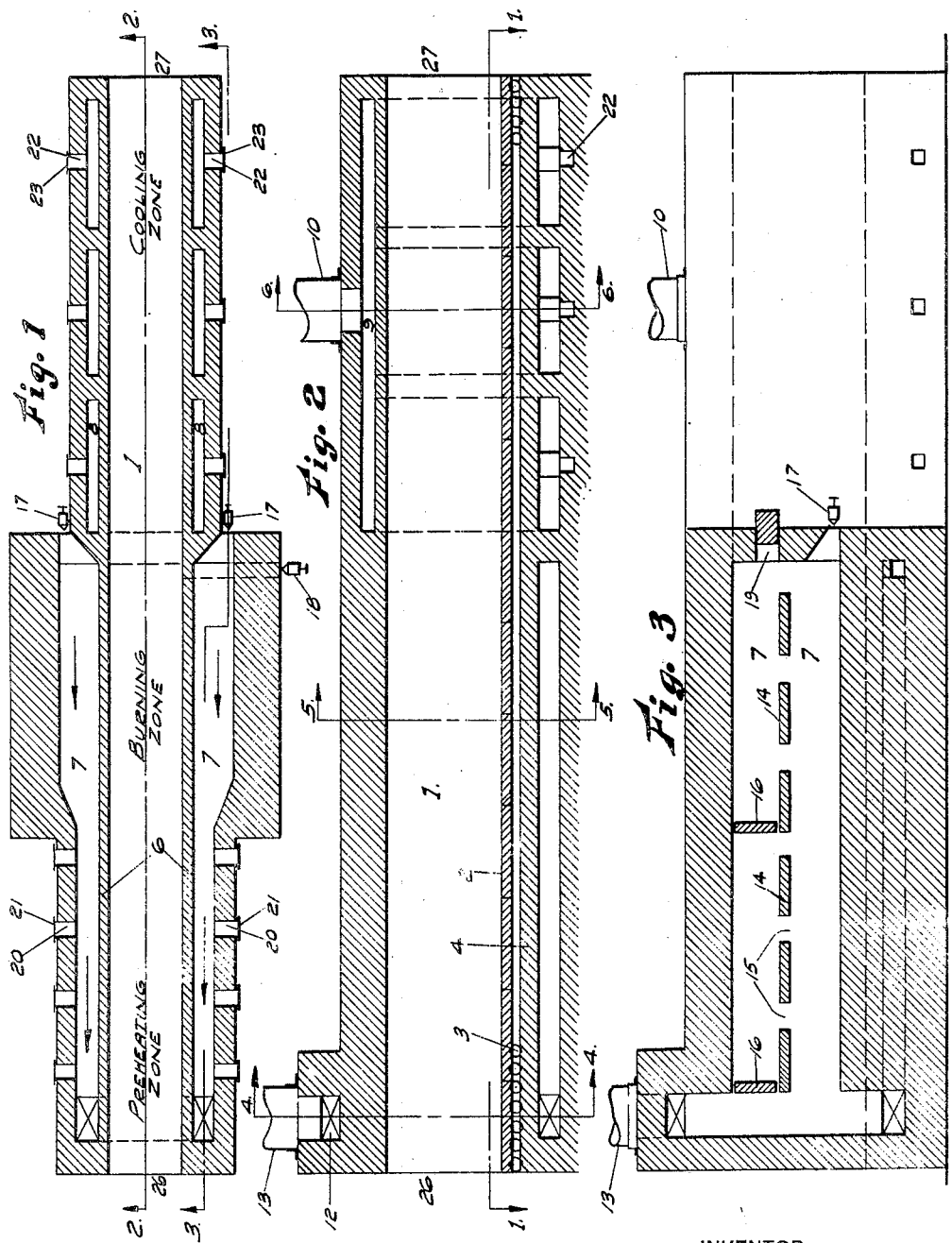

1,875,365

UNITED STATES PATENT OFFICE

HENRY G. BEGEMAN, OF NEW YORK, N. Y.

MUFFLE KILN

Application filed August 23, 1930. Serial No. 477,420.

This invention relates to a continuous tunnel muffle kiln, used for firing ceramic or other products, and especially to a kiln with a muffle closed at the bottom, requiring no cars for transporting the ware through the kiln, but using refractory or metal slabs as carriers of the ware.

Such continuous muffles, in which slabs for carrying the ware are being moved over the stationary bottom of the ware have been well known in the art for over 30 years and principally consist of a preheating, high temperature and cooling zone. Heretofore these muffles have been heated either on the bottom, sides and top, or on the bottom and sides only. The bottom had to be the hottest part if approximately uniform temperature was desired throughout the muffle. Since the heated bottom is considerably hotter than the hot air in the muffle, the layer of air touching the bottom will naturally be more highly heated than other layers of air in the muffle, and since the weight of the air will decrease with the increase in temperature, the hotter and lighter bottom layer will rise to the top of the muffle and will be replaced by the colder and heavier layer of air in the muffle, which upon touching the muffle bottom will then be heated up and rise to the top, etc.

This continuous up and downward movement of the air, however, not only moves the air, but practically all the dust contained in the air, which, being heavier than air, would settle on the bottom of the muffle if it was not continuously stirred up by the rising air. This condition is very detrimental to ceramic ware and especially to glazed ware as any dust and grit contained in the air will adhere to the glaze while it is in a sticky condition and burn in with the glaze thereby spoiling the appearance of the ware.

This great disadvantage will be entirely eliminated by my invention, comprising means for keeping the bottom much colder than sides and top of the muffle whenever ware is fired to which dust is detrimental.

This is accomplished by entirely disconnecting the bottom flue from the side flues and by providing the bottom flue with a separate burner. It is obvious that this arrangement will allow to vary the temperature of the muffle bottom within a very wide range. For instance, when firing certain bisque ware, which cannot be spoiled by dust, and which also requires higher temperature than glost firing, the bottom should preferably be hotter than the sides of the muffle, but when glost ware is fired the burner for the bottom flue would either be sufficiently throttled to keep the muffle bottom cool enough or should be entirely shut off, so that the muffle is heated from the sides only. If the ware requires no bottom heat at any time, the bottom heating flue could be entirely eliminated.

If no heat is applied to the bottom of the muffle it will be advisable to apply more heat to the lower part of the side muffle tiles than to the upper part. This, of course, can be accomplished by separating the side flue into upper and lower flue and by heating either one by a separate burner or separate set of burners.

My invention, however, does away with this necessity and accomplishes the same result with only one burner or one set of them. Burner and flue are so arranged that either all or most of the flame or hot gases from the burner will pass only through the lower part of the flue in such a way that the upper part will either entirely or partly be indirectly heated by the heat of the lower part of the flue and regulating means are provided, which make it possible to change the ratio of heat applied to the lower and upper part of the flue.

Although I generally do not supply any heat to the top of the muffle in the preheating and high temperature zone, I provide cooling flues in the cooling zone of the kiln either all around the muffle or on both sides and top of the muffle in such a way that no fan is required for pushing or pulling the cooling air through the flues, but that sufficient cooling air can be applied to the muffle tiles by the natural draft of a hot air stack in such a way, that different sections of the cooling end of the muffle can be regulated separately.

Heretofore the only means for regulating the preheating curve of the ware consisted in drawing the waste gases off at several pairs of ports. I have improved the preheating curve considerably by providing inlets for cold air at intervals in the waste gas flue in such a way that these cold air inlets can be regulated to suit the desired curves.

In the accompanying drawings, showing certain preferred embodiments of the invention;

Fig. 1 is a longitudinal horizontal section of the tunnel muffle kiln along line 1—1 of Fig. 2.

Fig. 2 is a longitudinal vertical section along line 2—2 of Fig. 1.

Fig. 3 is a longitudinal vertical section along line 3—3 of Fig. 1.

Fig. 4 is a cross section along line 4—4 of Fig. 2.

Fig. 5 is a cross section along line 5—5 of Fig. 2, and

Fig. 6 is a cross section along line 6—6 of Fig. 2.

The entire structure is built up of masonry, so as to form a muffle chamber 1 through which travel slabs 2, running on balls 3 over the muffle bottom 4 which separates the muffle from the bottom flue 5. Tiles 6, forming the sides of the muffle, separate it from heating flues 7 and cooling flues 8. These cooling flues lead to the top flue 9 and hot air stack 10. The bottom heating flue 5 connects with side flues 7 through ducts 11 and the waste gases travel from side flues 7 through ducts 12 into the chimney 13. Tiles 14 separate the flues 7 into lower and upper compartments, connected by passages 15. Dampers 16 regulate the volume of waste gases passing through the upper compartment. Heat is supplied to the flues 7 by burners 17 and to flue 5 by burner 18. In case of coal firing etc. these burners can be replaced by fireboxes. 19 indicates an opening which may be used for closing some of the passages 15 by firebricks. 20 are cold air inlets for regulating the preheating curve, the amount of air to be regulated by slides 21. The cooling air enters at openings 22, which can be regulated by slides or other means 23. The ware 24 is placed on suitable supports 25, resting on the movable slabs 2. 26 is the charging end and 27 the discharging end of the muffle.

In operating the kiln, the loaded slabs enter the muffle at 26 and are slowly moved through the preheating, burning and cooling zone towards the discharge end 27. The movement of the slabs can be either intermittent by pushing 1 slab length at a time, or continuous by a suitable pusher (not shown) located at the charging end of the kiln. The speed of pushing depends on the ware and temperature. The ware is ready for handling when leaving the kiln.

While I have described the best forms of my invention now known to me, it will be apparent to those skilled in the art, that many changes may be made without departing from the spirit of my invention.

I claim as my invention:

1. In a continuous tunnel muffle kiln separate heating flues for the bottom and each side of the muffle.

2. In a continuous tunnel muffle kiln separate means for heating the bottom and each side of the muffle.

3. In a continuous tunnel muffle kiln means for regulating the temperature of the bottom heating flue independently of the side heating flues.

4. In a continuous tunnel muffle kiln means for regulating the temperature of the bottom heating flue and of each side flue independently.

5. In a continuous tunnel muffle kiln means for heating the muffle on the sides only and for regulating the temperature of each side separately.

6. In a continuous tunnel muffle kiln, having movable slabs for carrying the ware sliding over the stationary bottom of the muffle, means for heating this bottom independently of the sides.

7. A continuous tunnel muffle kiln having side heating flues divided into lower and upper compartments and means for heating these compartments from the same burner or firebox.

8. A continuous tunnel muffle kiln with side heating flues separated by spaced tiles into lower and upper compartments, having one or more dampers in the upper compartment adapted to be regulated, whereby either all gases pass through the lower compartment, heating the upper compartment by radiation only, or else part of the gases also flow through the upper compartment simultaneously with the gases in the lower compartment and in the same direction.

9. In a continuous tunnel muffle kiln separate adjustable air inlets for each cooling compartment under the muffle and at the sides of the muffle.

In testimony whereof I affix my sixnature.

HENRY G. BEGEMAN.